No. 610,310.  
Patented Sept. 6, 1898.

T. SLOPER.
PNEUMATIC TIRE.
(Application filed July 20, 1897.)

(No Model.)  
2 Sheets—Sheet 1.

Witnesses:  
Thomas Durant  
J. B. Payton, Jr.

Inventor.  
Thomas Sloper  
by Church & Church  
his Attorneys

THE NORRIS PETERS CO., PHOTO-LITHO., WASHINGTON, D. C.

No. 610,310. Patented Sept. 6, 1898.
T. SLOPER.
PNEUMATIC TIRE.
(Application filed July 20, 1897.)
(No Model.) 2 Sheets—Sheet 2.
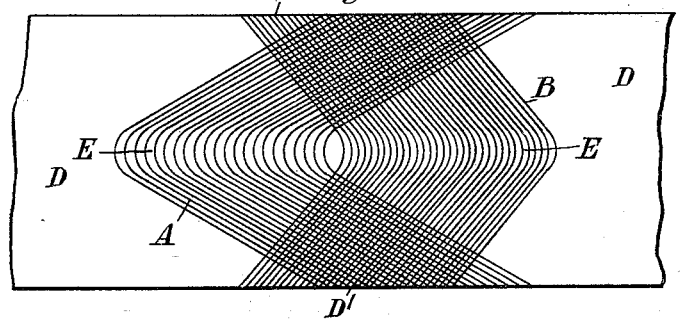
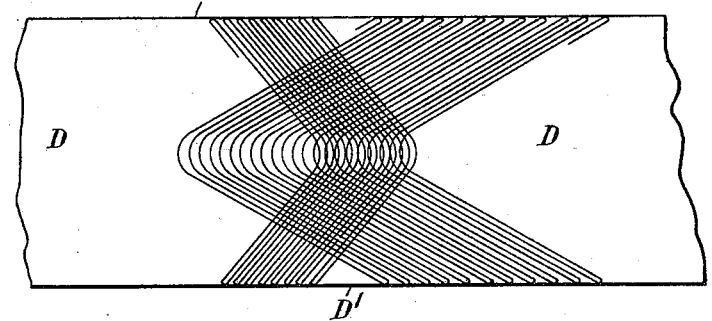
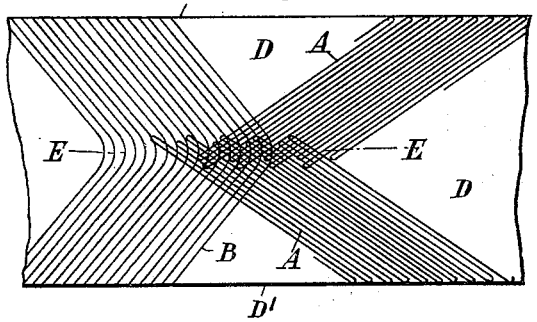
Witnesses:
Thomas Durant
J B Peyton Jr.
Inventor:
Thomas Sloper.
by Church & Church
his Attorneys.

UNITED STATES PATENT OFFICE.

THOMAS SLOPER, OF DEVIZES, ENGLAND.

PNEUMATIC TIRE.

SPECIFICATION forming part of Letters Patent No. 610,310, dated September 6, 1898.

Application filed July 20, 1897. Serial No. 645,257. (No model.) Patented in England November 16, 1896, No. 25,742.

*To all whom it may concern:*

Be it known that I, THOMAS SLOPER, a subject of the Queen of England, residing at Devizes, England, have invented certain new and useful Improvements in Pneumatic Tires, (for which I have obtained Letters Patent of Great Britain, No. 25,742, dated November 16, 1896,) of which the following is a specification.

This invention has for its object to construct a pneumatic tire which, as compared with those hitherto in use, shall be faster and more resilient and more comfortable for the rider or occupant of the vehicle provided with the said tires.

The invention may be said to consist generally in the employment of different series of oppositely-inclined restraining threads or wires extending at each side of the wheel from the wheel-rim to the tread of the tire, the threads of one series being at a less angle to a given tangent of the wheel than those of the other series. The threads may be formed of any flexible and approximately inextensible material, such as vegetable fiber or (where extra strength is necessary) wire. The metal and other threads may be used either alternately of or in conjunction with each other, the word "thread" or "threads" as herein employed being intended to embrace all these restraining devices.

The invention will be best understood by reference to the accompanying drawings, in which—

Figure 1:
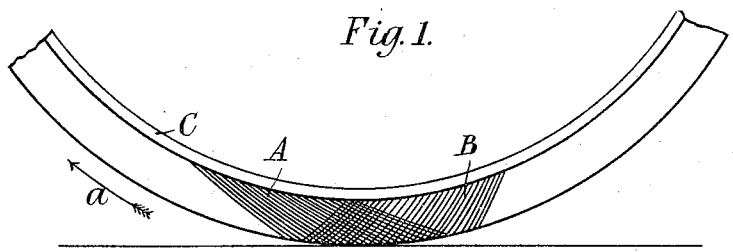

Figure 1 is a diagrammatic side elevation showing the general arrangement of the threads in my improved tire; and Figs. 2, 3, 4, 5, 6, and 7 are views showing different ways of arranging the threads in the tires.

Like letters indicate like parts throughout the drawings.

In Fig. 1, A and B represent the two series of oppositely-inclined threads, and C represents the wheel-rim. The threads B, as here shown, are at a greater angle to the rim C than the threads A.

Though, as hereinafter described, the restraining-threads may be of the same over-all length, the before-mentioned preferred arrangement causes the oppositely-inclined threads or portions of the threads at each side of the wheel to appear of different lengths, and for convenience I herein sometimes refer to these threads or portions of thread as the "longer" and "shorter" threads.

If the wheel is to be used for transmitting power at its periphery—as, for example, for propelling a cycle or other vehicle—I prefer to arrange the threads so that at the "driving" part of the wheel the longer threads A incline inward from the tread to the rim C toward the direction of rotation, as indicated in Fig. 1 with reference to the arrow $a$. The threads may, however, be arranged in the reverse way, if desired.

Figure 2:
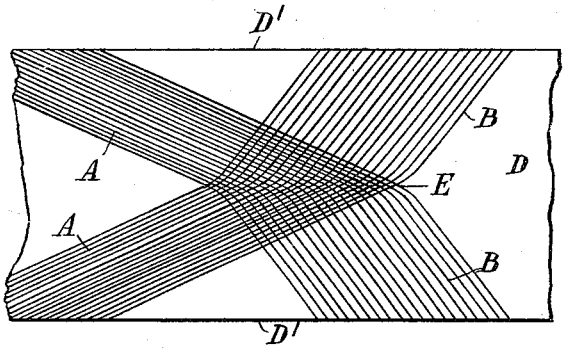

The before-mentioned arrangement of the threads may be obtained in various ways, of which the following are given as examples:

In Fig. 2 I have shown an arrangement wherein two series of threads or thread-loops are employed, each series diagonally crossing the other in the usual manner, excepting that instead of the threads being straight and making the same angle with both of the selvages D' of the foundation material D throughout their length they are bent at about the tread portion E, (hereinafter termed the "tread" E E,) so that the portion A of each thread on one side of the tread E E is at an angle to the portion B thereof on the other side of the tread E E. Each layer or series of threads is bent in a similar manner to the other, so that the two layers are at different angles to each other on each side of the tread E E and the threads on each side have corresponding threads on the opposite side.

Figure 3:
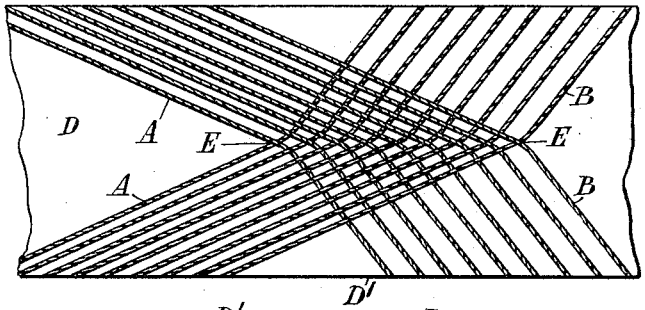

The threads may be arranged in two distinct layers, one laid across the other without interweaving, as indicated, for example, in Fig. 2; or, as shown on an exaggerated scale in Fig. 3, the threads of each series may be laid over and under those of the other series of threads at respectively opposite sides of the tread E E, so that the threads which form the outer layer at one side of the tread E E constitute the inner layer at the opposite side thereof.

Figure 4:
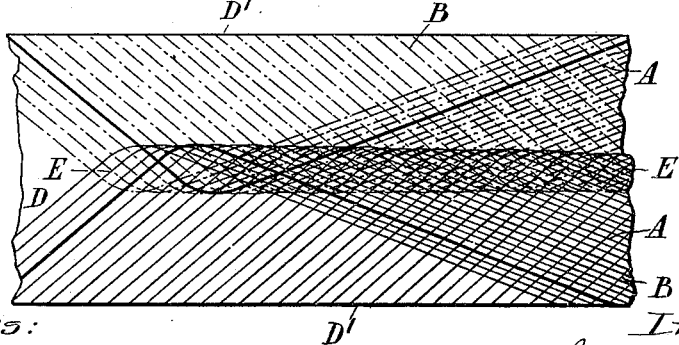

In Fig. 4 the threads are arranged in such manner that each one is approximately parallel with the selvages D' for a short distance near the tread E E. In this arrangement the threads are formed of two series of loops, the two ends of each loop of the respective series being attached to the same selvage D' and the bend of the loops being slightly beyond the tread E E, so that at this part the two series of loops overlap each other. The two ends of each loop are at different angles to the selvages D', so as to provide the before-mentioned longer and shorter threads A B.

The differently-inclined threads A B may be constituted by respectively different series of threads. For example, in Fig. 5 the threads A are formed by one series of loops and the threads B by a separate series of loops. Each loop is formed by a thread starting at an angle from one selvage D' to the tread E and inclining at the same angle in the reverse direction from the tread E to the opposite selvage, the two series of loops making, respectively, different angles to the selvages D' and tread E E to provide the necessary longer and shorter threads A B, for which latter purpose the two series of loops are composed of threads of different length.

Fig. 6 indicates how the last-described arrangement may be obtained by employing a continuous thread for forming each series of the thread-loops.

In Fig. 7 three separate threads are used, two constituting the two series of longer threads A at the respectively opposite sides of the tread E E and the third constituting the series of shorter threads B. Each of the series of longer threads A is composed of a continuous thread passing at an incline backward and forward between one of the selvages D' and the tread E E or a part near or slightly beyond the said tread, the bends of the threads A being preferably arranged to "break joint" with each other, as shown in Fig. 7.

The continuous-thread arrangement shown in Fig. 6 as applied to the particular construction of tire represented in Fig. 5 may be equally well applied to any of the forms of tire shown in the other figures, as will be well understood without further description.

Instead of bending the threads as described the tire may be built up of different pieces of fabric containing parallel threads. This fabric may be cut at suitable angles relatively to the threads and so arranged as to overlap or break joint at the parts at which the threads are previously described to be bent.

In making tubular tires according to this invention parallel threads may be arranged in the form of curves or bends on rubber or foundation, which may afterward be rolled up or folded in such manner as to cause the threads in the finished tire to be arranged in the particular manner before described.

Where hitherto curved diagonal threads have been employed in pneumatic tires, they have been arranged at approximately equal angles in both the forward and backward directions, and in all such cases the effect of my invention is not obtained.

More than two layers of thread may be employed, if desired, each layer being separated from the neighboring layer by a thin sheet of rubber interposed between them, by which means the friction taking place between the threads in the finished tire when running will be reduced to a minimum. When the threads are formed of metal, to insure them retaining their position in the finished tire they may be covered with fibrous thread, wound or braided on, this fibrous thread preferably being saturated with rubber solution before it is applied to the wire, so as to cause it to better amalgamate with the other rubber of the tire in the process of vulcanization.

The different layers may, if desired, be interwoven with each other. I prefer to arrange the longer threads at the outside of the shorter threads.

To bind together the various layers of the tire, I sometimes provide a few rows of elastic stitching at suitable parts thereof.

The before-described arrangement may be applied to the construction of either tire-covers or complete tubular tires, the word "tire" employed at other parts of this specification and in the claims being intended to embrace all such devices.

I find the before-described arrangement of differently-inclined threads produces certain new and useful effects in the tires. For example, it causes the shorter threads inclining in one direction to be at a greater tension than the longer threads inclining in the other direction, in consequence of which when the tire is flattened on the road the shorter threads take up the "slack" which is due to the flattening and the longer threads through which the driving power is applied remain taut. Another advantageous effect is that the side bulging of the tire due to flattening against the road is less severe than is the case with tires of the ordinary construction, and the tire begins to take a flattened form before it actually comes into contact with the road when in use.

In tires of the usual construction having diagonal threads set at approximately equal angles in both directions there is a considerable amount of friction between the outer skin of the tire and the road-surface. This is due to the reduction of the circumference of the wheel at the part in contact with the road, or, in other words, it is consequent upon the natural arch or curve of the tire being straightened to a flat form where in contact with the road. In tires made according to this invention the friction between the skin of the tire and the road is greatly reduced, because the tire begins to take its "weight-bearing" form before it comes into actual contact with the road.

The strains and internal friction which occur in the fabric of tires hitherto constructed are greatly reduced in the tires constructed according to the present invention, besides which my improved tires possess a very remarkable degree of resilience and elasticity even when they are very fully inflated.

I claim—

1. A pneumatic tire formed on foundation material, and of oppositely-inclined restraining-threads, the threads inclined in one direction on one side of the tire being at a less angle to a given tangent of the wheel than those inclined in the opposite direction on the same side of the tire; substantially as described.

2. In a pneumatic tire restraining-threads of different lengths radiating from the tread portion of the tire the longer threads all extending in one direction and the shorter threads all extending in the other direction; substantially as set forth.

3. In a pneumatic tire restraining-threads radiating from the tread portion at different angles, all the threads extending in one direction round the wheels being longer, and at such an angle that they enter the rim farther away from the point where they leave the tread than the shorter threads extending round the wheel in the other direction; substantially as set forth.

4. In a pneumatic tire restraining-threads slanting diagonally from the rim of the wheel to the tread portion the length of the threads slanting from the rim downward in one direction being greater than the length of the threads slanting from the rim downward in the other direction; substantially as set forth.

5. In an endless tubeless pneumatic tire, the combination with restraining-threads converging from the rim to the tread in one direction from opposite sides of the tire, of threads converging from the rim to the tread in the other direction from opposite sides of the tire, the threads converging in one direction being set at a greater angle from the tangent of the wheel than those converging in the opposite direction; substantially as set forth.

6. In a pneumatic tire the combination with approximately parallel threads slanting downward at an angle from the bottom of the wheel-rim on each side to the tread of a similar series of threads slanting downward from the rim to the tread in the reverse direction at a different angle substantially as set forth.

7. In a pneumatic tire, the combination with the restraining-threads incorporated therein slanting downward at an angle to the plane of the wheel from the lower part of the rim to the tread portion of the tire, of restraining-threads slanting in the reverse direction and at an angle to the plane of the wheel differing from that of the former threads; substantially as set forth.

8. In a pneumatic tire, the combination with a foundation material of oppositely-inclined restraining-threads, covered and interwoven with each other, the threads inclined in one direction on one side of the tire being at a different angle to a given tangent of the wheel from the threads inclined in the opposite direction on the same side; substantially as described.

9. In a pneumatic tire, the combination with a foundation material of bent threads extending diagonally across the said material the portion of each thread on one side of the tread being at a different angle to a given tangent of the tire to that portion on the other side of the tread; substantially as set forth.

10. In a pneumatic tire, the combination with a foundation material and a layer of bent threads extending in one direction diagonally across the foundation material of another layer of bent threads extending in an opposite direction across the said material the portion of each thread on one side of the tread being at a different angle to a given tangent of the tire to the portion on the other side of the tread; substantially as set forth.

11. In a pneumatic tire the combination with a foundation material of a number of bent threads each inclining in one direction toward the tread and outward from the tread in the opposite direction and at a different angle; substantially as set forth.

12. In a pneumatic tire having threads crossing diagonally from one side to the other such threads crossing over the center or tread portion of the tire at a position nearer to one end of the thread than the other end; substantially as set forth.

13. In a wheel-tire inelastic threads slanting from the rim downward across the tread and returning to the rim at a different angle on the other side of the tire; substantially as set forth.

In testimony whereof I have hereto set my hand in the presence of the two subscribing witnesses.

THOMAS SLOPER.

Witnesses:
HARRIETT EMMA TARGETT,
ROBERT SLOPER.